United States Patent
Lindholm et al.

(10) Patent No.: US 12,428,238 B2
(45) Date of Patent: Sep. 30, 2025

(54) CONVEYOR ROLLER

(71) Applicant: Interroll Holding AG, Sant Antonino (CH)

(72) Inventors: Armin Lindholm, Hückelhoven (DE); Jörg Lemke, Hückelhoven (DE); Dominik Langensiepen, Hückelhoven (DE)

(73) Assignee: Interroll Holding AG, Sant' Antonio (CH)

( * ) Notice: Subject to any disclaimer, the term of this patent is extended or adjusted under 35 U.S.C. 154(b) by 125 days.

(21) Appl. No.: 18/275,815

(22) PCT Filed: Feb. 4, 2022

(86) PCT No.: PCT/EP2022/052756
§ 371 (c)(1),
(2) Date: Aug. 4, 2023

(87) PCT Pub. No.: WO2022/171541
PCT Pub. Date: Aug. 18, 2022

(65) Prior Publication Data
US 2024/0116716 A1 Apr. 11, 2024

(30) Foreign Application Priority Data
Feb. 12, 2021 (DE) .......................... 102021103408.6

(51) Int. Cl.
*B65G 39/02* (2006.01)
*B65G 39/12* (2006.01)

(52) U.S. Cl.
CPC ............ *B65G 39/02* (2013.01); *B65G 39/12* (2013.01)

(58) Field of Classification Search
None
See application file for complete search history.

(56) References Cited

U.S. PATENT DOCUMENTS

| | | | | |
|---|---|---|---|---|
| 3,724,643 A | * | 4/1973 | Kohl | B65G 13/07 198/787 |
| 4,006,815 A | * | 2/1977 | Werntz | B65G 13/075 198/781.04 |
| 4,221,288 A | * | 9/1980 | Rae | B65G 13/07 198/781.08 |
| 4,416,650 A | * | 11/1983 | Wilkins | B65G 39/02 474/902 |
| 4,421,224 A | * | 12/1983 | Dingman | B65G 13/07 198/781.04 |

(Continued)

FOREIGN PATENT DOCUMENTS

| | | | |
|---|---|---|---|
| CN | 208731948 U | * | 4/2019 |
| DE | 4201499 A1 | | 12/1992 |

(Continued)

*Primary Examiner* — Kavel Singh
(74) *Attorney, Agent, or Firm* — Michael Soderman

(57) ABSTRACT

The invention relates to a transport roller (1) for a conveying device (100), in particular for conveying pallets and/or containers, the transport roller (1) comprising: an in particular tube-shaped roller body (2), a drive wheel (5) for in particular connecting the transport roller (1) to a rotary drive (102) of a conveying device (100), in particular an adapter assembly (A) for connecting the drive wheel (5) to the roller body (2).

14 Claims, 3 Drawing Sheets

(56) References Cited

U.S. PATENT DOCUMENTS

| | | | | |
|---|---|---|---|---|
| 5,161,673 A * | 11/1992 | Cairns | ................... | B65G 13/07 |
| | | | | 198/781.04 |
| 6,003,661 A * | 12/1999 | Beck | ..................... | B65G 39/02 |
| | | | | 198/790 |
| 7,594,572 B2 * | 9/2009 | Vogl | ...................... | B65G 13/07 |
| | | | | 198/791 |
| 10,926,959 B2 * | 2/2021 | Lindemann | ............ | B65G 13/06 |
| 2011/0222810 A1 * | 9/2011 | Lubezny | ................ | B65G 39/12 |
| | | | | 384/549 |

FOREIGN PATENT DOCUMENTS

| | | |
|---|---|---|
| DE | 102004002529 B3 | 5/2005 |
| DE | 202009005878 U1 | 8/2009 |
| DE | 202017006722 U1 | 3/2018 |
| EP | 0104953 A2 | 4/1984 |
| FR | 1380687 A | 12/1964 |
| JP | S51147884 A | 12/1976 |
| JP | H09263314 A | 10/1997 |
| JP | 2003336625 A | 11/2003 |
| WO | 9954241 A1 | 10/1999 |

\* cited by examiner a)

b)

CONVEYOR ROLLER

CROSS REFERENCE TO RELATED APPLICATIONS

This application is the U.S. national stage of International Application No. PCT/EP2022/052756, filed on 2022 Feb. 4. The international application claims the priority of DE 102021103408.6 filed on 2021 Feb. 12; all applications are incorporated by reference herein in their entirety.

BACKGROUND

The invention relates to a conveyor roller.

Such conveyor rollers are particularly applicable in a conveyor device for pallets and containers. Conveyed objects in such installations have in particular a weight of at least 100 kg or at least 500 kg. The conveyor rollers must be designed so that at least at times in individual operating states almost the entire weight of the conveyed object rests on a single roller.

Due to the rotary motion, the conveyor roller is subjected to constant alternating loads with high bending moments. To withstand this load, the load-bearing components are preferably welded together.

Such a conveyor roller is described in DE 20 2009 005 878 U1. In this, a cylindrical round tube is welded to a bearing section.

Such conveyor rollers comprise load-bearing components, which are made of steel in particular. The conveyor rollers are manufactured individually on the basis of individual orders. The aim is therefore to achieve short delivery times. First, those components of the conveyor roller are selected which fit the respective order and are pre-machined accordingly. This is followed by welding. Only after welding is the corrosion protection applied so that the weld seam is also included in the corrosion protection. Corrosion protection is usually carried out by specialized companies, in particular by galvanizing. For this purpose, the conveyor rollers are to be packed and shipped. After the corrosion protection treatment, the conveyor rollers are returned by the specialized company and further processing (insertion of bearings and fasteners) can take place. Since the conveyor rollers are manufactured to order, the intermediate corrosion protection treatment results in a disadvantageous extension of the delivery times.

U.S. Pat. No. 3,724,643 A discloses a conical transport roller. This comprises two separate continuous roller bodies. An inner roller body is cylindrical and extends over substantially the entire length of the roller. An outer roller body is conical and is supported on the cylindrical roller body by a support ring. The drive gears are welded directly to the continuous cylindrical roller body.

WO 99/054241 A1 discloses a drive roller for a roller conveyor or a belt conveyor, in which a roller bottom is provided with a universal coupling device. Modular drive wheels are designed to correspond to the coupling device and a variable number of drive wheels can be engaged with the coupling device by plugging them on. Such rollers are suitable for comparatively light loads.

SUMMARY

Conveyor roller (1) for a conveyor device (100), in particular for conveying pallets and/or containers,
the conveyor roller (1) comprising:
a cylindrical roller body (2),
a drive wheel (5), in particular for connecting the conveyor roller (1) to a rotary drive (102) of a conveyor device (100),
an adapter assembly (A) for connecting the drive wheel (5) to the roller body (2).

DETAILED DESCRIPTION

It is the object of the present invention to provide an improved conveyor roller. The invention is solved by a conveyor roller, a conveyor device, a modular system and a method according to the respective main claims; embodiments are the subject of the subclaims and the description.

The adapter assembly enables to connect the basic components such as the roller body and drive wheel with each other, whereby components with different dimensions can be used here. The adapter assembly enables low complexity with high variability at the same time.

In particular, the use of the adapter tube and an adapter ring can provide a high degree of variability in a simple and cost-effective manner. The adapter tube provides a high degree of variability in the axial length and in the axial position of the individual components; the adapter ring provides variability in the diameters. Both the adapter tube and the adapter ring are formed in particular from geometrically very simple components that are inexpensive to procure.

In particular, the roller body, the adapter assembly, the adapter ring, the adapter tube and/or the drive wheel are provided with corrosion protection. In particular, the respective component has a zinc coating on the surface. The respective component preferably already has this corrosion protection before being joined to the respective other component.

A laser welded joint is particularly suitable for producing a join connection. On the one hand, the laser welded joint creates a very stable connection; on the other hand, the seam is so small that the effect of corrosion protection already present before joining is retained. In particular, a zinc layer is only destroyed to such a small extent that the cathodic corrosion protection is nevertheless retained.

In one embodiment, the corrosion protection, in particular the zinc layer, is interrupted in the area of the laser welded joint. This is produced by the laser welding process. In particular, however, the laser welding process is carried out in such a way that the interruption is so slight that the protective effect is nevertheless also provided for the exposed sections of the components in the area of the interruption.

The conveyor arrangement according to the invention comprises a plurality of conveyor rollers according to any one of the preceding claims. The conveyor arrangement is in particular a pallet conveyor line or a container conveyor line. The conveyor arrangement is in particular adapted to convey a conveyed object having a weight of at least 100 kg, preferably at least 500 kg.

In one embodiment, the conveyor comprises a rotary drive, having a motor and a transmission means, for driving at least one of the conveyor rollers. The transmission means is drive-connected to the drive wheel.

In the process according to the invention, the roller body and the drive wheel are connected to each other at least indirectly. The connection can be made by applying the laser welded joint.

The method may comprise the steps of: selecting a drive wheel, in particular from a plurality of differently formed, in particular dimensioned drive wheels; selecting a roller body, in particular from a plurality of differently formed, in particular dimensioned roller bodies; c the drive wheel to the roller body using the adapter assembly. The different dimensions may in particular be different outer diameters or inner diameters.

In particular, the drive wheels have different inner diameters.

In particular, the roller bodies have different inner diameters and/or different outer diameters.

In particular, the adapter rings of the adapter assembly have different inner diameters and/or different outer diameters.

In particular, the adapter tubes of the adapter assemblies have different outer diameters.

In one embodiment, an axial distance is defined between the drive wheel and the roller body; the subsequent arrangement of the drive wheel on the adapter assembly and/or arrangement of the adapter assembly on the roller body, and/or arrangement of the adapter ring on the adapter tube, takes place in a position that depends on the defined axial distance.

The modular system according to the invention for manufacturing a conveyor roller comprises a plurality of differently designed, in particular dimensioned, roller bodies, a plurality of differently designed, in particular dimensioned, drive wheels, adapter assemblies for selectively connecting a selected drive wheel selected from the plurality of differently designed drive wheels to a selected roller body selected from the plurality of differently designed, in particular dimensioned, roller bodies. Thus, a large number of variants of the conveyor roller can be manufactured using only a few components.

The term cylindrical is used in particular to distinguish it from conical rolls; there may be slight deviations from an exactly cylindrical shape, especially in the area of the ends of the roller body.

BRIEF DESCRIPTION OF THE DRAWINGS

The invention is explained in more detail by way of example with reference to the figures below. Herein shows FIG. 1 partially a conveyor roller according to the invention in a first embodiment in longitudinal sectional view.

DETAILED DESCRIPTION OF THE PREFERRED EMBODIMENTS

Figure 5:
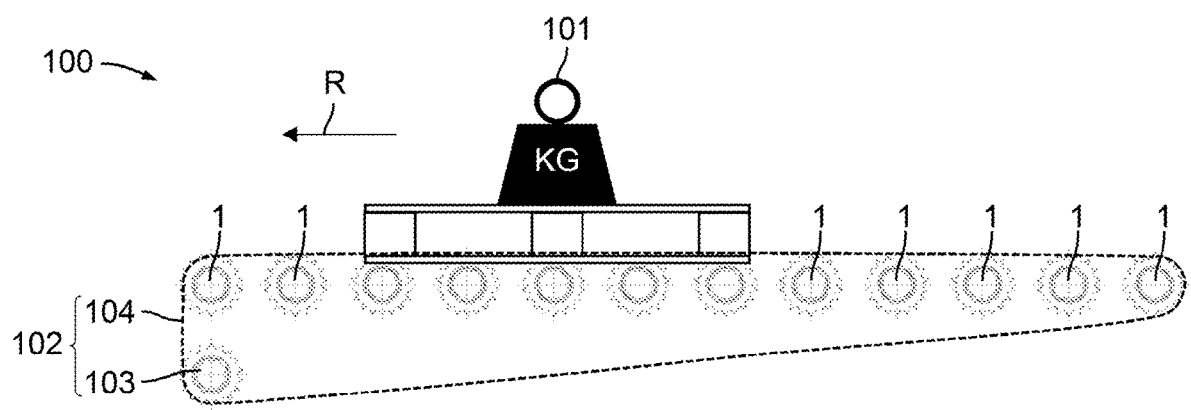
FIG. 5 a conveyor with a plurality of conveyor rollers.

FIG. 5 shows a conveyor device 100 with a plurality of conveyor rollers 1 according to the invention. The conveyor rollers 1 are arranged parallel to each other transversely to the conveying direction R. The conveyor rollers 1 are arranged parallel to each other. A conveyed object 101 is transported on the conveyor rollers. The conveyed object 101 may comprise a pallet or a container. A single conveyed object 101 may have a weight of 500 kg. If the weight distribution is unfavorable, at least a large part of the weight of the conveyed object can be supported on a single conveyor roller 1. Each individual conveyor roller 1 is adapted to support this weight.

The conveyor rollers are driven by a rotary drive 102. The rotary drive comprises a motor 103 and a transmission means 104, in particular a drive chain, which forms a drive connection between the motor 103 and the conveyor rollers 1.

Figure 1:
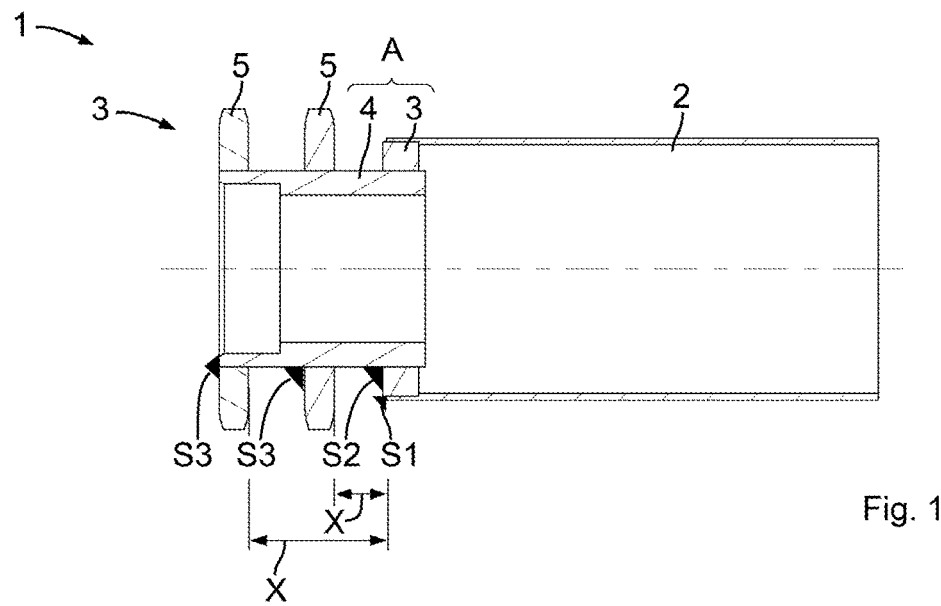
Figure 2:
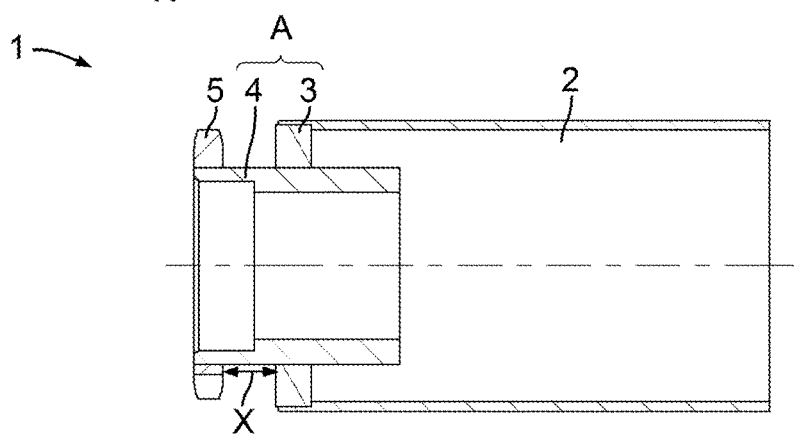
FIG. 2 partially a conveyor roller according to the invention in a second embodiment in longitudinal sectional view.
Figure 3:
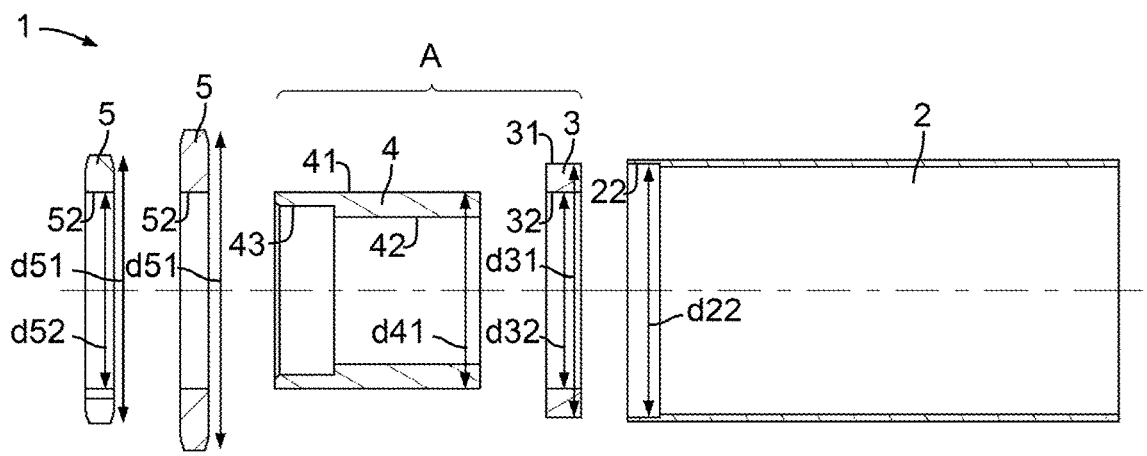
FIG. 3 partially a conveyor roller according to the invention in a third embodiment in single-part and longitudinal sectional view.

FIGS. 1 to 3 are described together below.

The conveyor roller 1 according to the invention comprises a tubular roller body 2. At least one drive wheel 5 is attached to the roller body 2. The drive wheel 5 is in particular a gear wheel and serves for the drive connection of the conveyor roller with the rotary drive, in particular by means of a drive chain. Belt pulleys are also conceivable as an alternative to the gear wheel design.

An adapter assembly A is provided for attaching the drive wheel 5 to the roller body 2. The adapter assembly A comprises an adapter tube 4 and an adapter ring 3.

The adapter tube 4 has a cylindrical outer surface 41 against which the drive wheel 5 rests with a cylindrical inner surface 52. The drive wheel 5 can be arranged at different axial positions on the adapter tube. In this regard, FIGS. 1 and 2 show that the drive wheels can be arranged with different axial distance X with respect to the roller body. Several drive wheels 5 can also be attached to the adapter tube (FIG. 1). Drive wheels 5 of different types can be attached to the adapter tube 4. The different drive wheels can have different outer diameters d51. An inner diameter d52 of the inner surface 52 of the drive wheel 5 corresponds to an outer diameter d41 of the outer surface 41 of the adapter tube 4.

An adapter ring 3 is attached to the roller body 2. The adapter ring 3 rests with a cylindrical outer surface 31 against a cylindrical inner surface 22 of the roller body 2.

The adapter tube 4 rests against a cylindrical inner surface 32 of the adapter ring 3 with a cylindrical outer surface 41. This determines the radial alignment of the adapter ring 3 to the adapter tube. An inner diameter d32 of the adapter ring 3 corresponds to the outer diameter d41 of the adapter tube 4.

The adapter ring 3 is axially fixed to the conveying tube 2 by a first welded joint S1. The adapter tube 4 is axially fixed to the adapter ring 3 by a second welded joint S2. The drive wheel 5 is axially fixed to the adapter tube 4 by a third welded joint S3. The welded joints are formed circumferentially in each case. Alternatively, discrete spot welds or welds formed in sections may be sufficient in certain applications.

For simplicity, the welded joints are shown only in the lower half of FIG. 1, and the welded joints are shown in exaggerated size for illustrative purposes. If, as in the embodiment example of FIG. 1, two drive wheels 5 are provided, each of the drive wheels 5 may be connected to the adapter tube 4 via a respective third welded joint S3.

The cylindrical surface pairings 41, 32 or 41, 52 allow the adapter ring or drive wheel to be arranged in different axial positions on the adapter tube 4 as required before the welded joint is applied.

Figure 4:
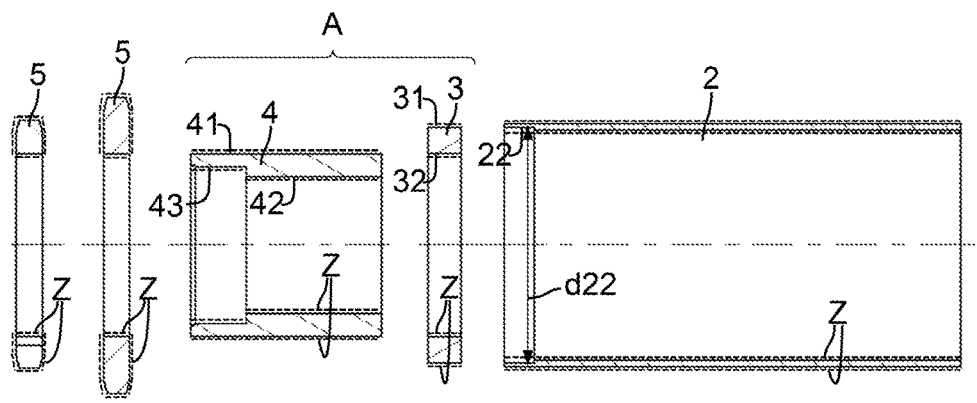
FIG. 4 components of a modular system for assembling a conveyor roller.
Figure 4:
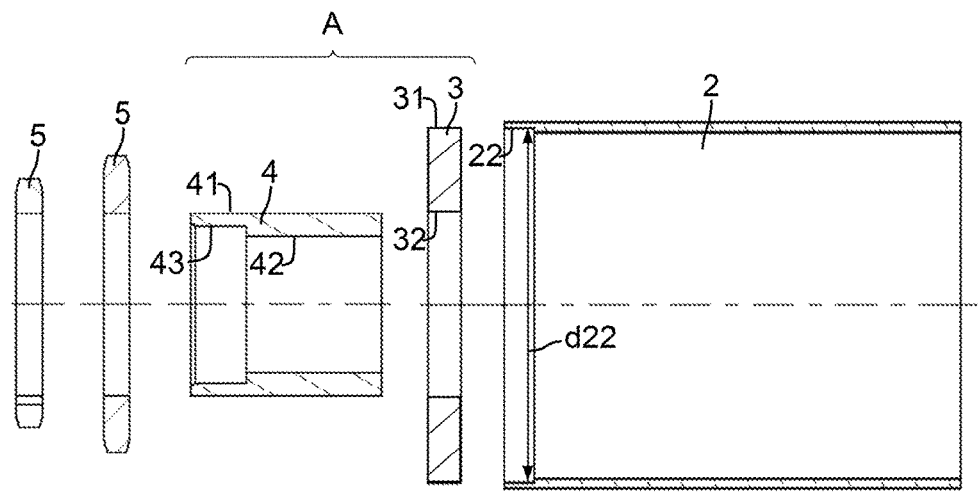

FIG. 4 shows parts of a modular system. Different adapter assemblies A are provided to selectively connect differently designed roller bodies 2 to differently designed drive wheels 5. The roller bodies 2 can differ from each other by an inner diameter d22 at the inner surface 22. The different adapter rings 3 can differ from each other by different outer diameters d31 at an outer surface 31. The inner surface 22 of a roller body 2 to be fastened is arranged on the outer surface 31 of the adapter ring 3 in each case.

The inner diameters d32 of the different adapter rings 3 can be identical, since a similar adapter tube 4 with identical outer diameter d41 can always be used for all variants. The adapter rings 3 thus serve to provide a uniform connection option for the adapter tube 4 with differently designed roller bodies, whereby the outer surface 41 of the adapter tube 4 is arranged on the inner surface 32 of the adapter ring 3. The inner diameters d31 of the differently designed adapter rings 3 correspond to the outer diameter d41 of the adapter tube 4.

FIGS. 1 to 4 show the simple construction of components 2-5. These components can be purchased "off the shelf" and are therefore available at low cost. In particular, the components of the adapter assembly A can be cut from long tube parts and are available for assembly after minor machining.

FIG. 4a shows the components 2-5 of the conveyor roller 1 before assembly. The components 2-5 are provided with a corrosion protection Z. The corrosion protection is in particular a corrosion protection layer. The corrosion protection is in particular a cathodic corrosion protection. In particular, the components 2-5 are galvanized. The corrosion protection Z is shown by way of example only in FIG. 4 as representative of all other embodiments.

In particular, the components can be strip galvanized precursors. Alternatively, the starting products can be provided with a different type of corrosion protection. In contrast to previous practice, the intermediate step of providing the conveyor roller with the corrosion protection after assembly is omitted.

Consequently, components 2-5, which are joined together by the welded joint, already have the corrosion protection when the welded joint is made. For this purpose, a laser welding process is used which produces a weld seam width of less than 1 mm. The underlying base material of two adjacent components subsequently forms a material-to-material bond. Although the layer forming the corrosion protection is destroyed locally, the laser only opens the previously completely closed corrosion protection layer by a gap of less than 1 mm, so that the corrosion protection, in particular the cathodic protection, is still sufficiently intact.

When an order is received, the conveyor rollers can now be assembled from existing, pre-galvanized components and shipped directly. The downstream galvanizing of the assembled components, which is often carried out by external specialized companies, can be omitted, which significantly reduces the delivery time from receipt of the order.

Figure 6:
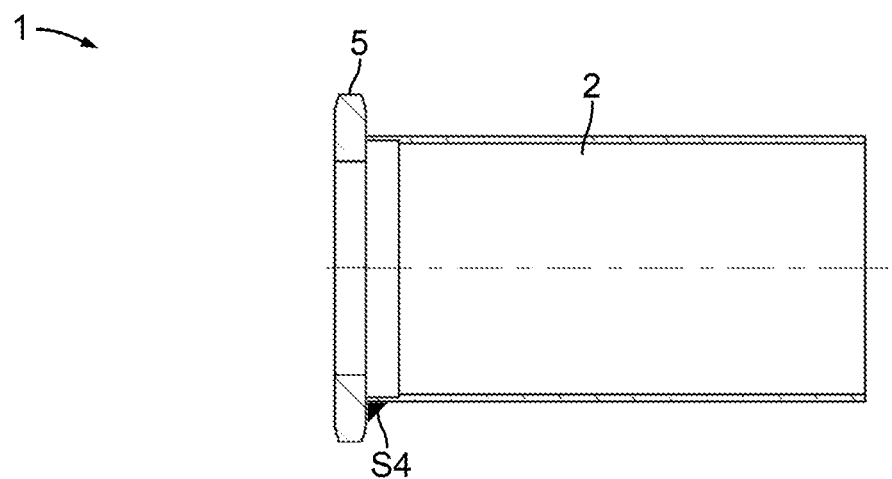
FIG. 6 partially a conveyor roller according to the invention in a fourth embodiment.

In the embodiment shown in FIG. 6, the drive wheel 5 is directly connected to the roller body 2 via a laser welded joint S4. The laser welded joint S4 is attached to an end face of the drive wheel 5 and to an outer circumferential surface of the roller body 2.

LIST OF REFERENCE NUMERALS

| | |
|---|---|
| 1 | conveyor roller |
| 2 | roller body |
| 22 | inner surface of roller body |
| A | adapter assembly |
| 3 | adapter ring |
| 31 | outer surface of adapter ring |
| 32 | adapter ring mounting hole |
| 4 | adapter tube |
| 41 | outer surface of adapter tube |
| 42 | through hole |
| 43 | bearing seat (not shown in FIG. 4) |

LIST OF REFERENCE NUMERALS -continued

| | |
|---|---|
| 5 | drive wheel, in particular gear wheel for connection to drive chain |
| 52 | inner surface of drive wheel |
| S1 | first welded joint |
| S2 | second welded joint |
| S3 | third welded joint |
| S4 | fourth welded joint |
| R | conveying direction |
| 100 | conveyor device |
| 101 | conveyed object, in particular comprising pallet or container |
| 102 | rotary drive |
| 103 | motor |
| 104 | transmission means |
| d22 | inner diameter of roller body |
| d31 | outer diameter of adapter ring |
| d32 | inner diameter of adapter ring |
| d41 | outer diameter of adapter tube |
| d52 | inner diameter of drive wheel |
| d51 | outer diameter of drive wheel |
| Z | zinc layer |

The invention claimed is:

1. A method for producing a conveyor roller, the conveyor roller (1) comprising:
   a cylindrical roller body (2),
   a drive wheel (5), in particular for connecting the conveyor roller (1) to a rotary drive (102) of a conveyor device (100),
   an adapter assembly (A) for connecting the drive wheel (5) to the roller body (2), the method comprising the following steps:
   providing the, in particular tubular, roller body (2),
   providing the drive wheel (5),
   at least indirectly connecting the drive wheel (5) to the roller body (2) by applying a laser welded joint,
   the roller body (2), the adapter assembly (A), and the drive wheel (5) are provided with a zinc layer (2) on the surface,
   wherein the drive wheel (5), the adapter assembly (A) and the roller body (2) are provided with the zinc layer before assembly.

2. The method for producing the conveyor roller according to claim 1,
   characterized by
   a laser welded joint (S1, S2, S3, S4) adapted for at least indirect connection of the drive wheel (5) to the roller body (2),
   in particular wherein it is connected to each other by the laser welded joint (S1, S2, S3, S4)
      the drive wheel (5) with the adapter assembly (A), in particular with the adapter tube (4) and/or
      the roller body (2) with the adapter assembly (A), in particular with the adapter ring (3) and/or
      the adapter ring (3) with the adapter tube (4), and/or
      the drive wheel (5) directly with the roller body (2).

3. The method for producing the conveyor roller according to claim 2,
   wherein the laser welded joint is arranged at
      an end face or outer surface of the roller body (2) and/or
      an end face of the drive wheel (5) and/or
      at an end face and/or outer circumferential surface of the adapter tube (4)
   and/or
      at an end face and/or outer circumferential surface of the adapter ring (3).

4. The method for producing the conveyor roller according to claim 1,
characterized
in that the corrosion protection (Z) is interrupted in the area of the laser welded joint (S1, S2, S3).

5. A conveyor device (100), comprising
a plurality of conveyor rollers (1) produced according to claim 1.

6. The conveyor device (100) according to claim 5,
wherein the conveyor device is adapted to convey a conveyed object,
wherein the conveyed object (101) has a weight of at least 100 kg, preferably at least 500 kg, and/or
wherein the conveyed object (101) comprises a container and/or a pallet.

7. The conveyor device (100) according to claim 5,
wherein the conveyor device (100) comprises
a rotary drive (102), comprising a motor (103) and a transmission means (104), for driving at least one of the conveyor rollers (1), wherein the transmission means (104) is drivingly connected to the drive wheel (5).

8. The method of producing the conveyor roller according to claim 1,
comprising the following further steps:
selecting a drive wheel (5), in particular from a plurality of differently formed drive wheels (5);
selecting a roller body (2), in particular from a plurality of differently formed roller bodies (2);
connecting the drive wheel (5) to the roller body (2) by means of the adapter assembly (A).

9. The method of producing the conveyor roller according to claim 1,
comprising the further steps of
defining an axial distance (X) between the drive wheel (5) and the roller body (2), and then
arranging the drive wheel (5) on the adapter assembly (A) and/or
arranging the adapter assembly (A) on the roller body (2), and/or
arranging the adapter ring (3) on the adapter tube (4)
each in a position that depends on the defined axial distance.

10. A modular system for use in a method according to claim 1, comprising,
a plurality of differently configured roller bodies (2),
a plurality of differently configured drive wheels (5),
adapter assemblies (A) for selectively connecting a selected one of the plurality of differently configured drive wheels (5) to a selected one of the plurality of differently configured roller bodies (2).

11. The modular system according to claim 10,
characterized in
that the roller bodies (2) have different inner diameters (d22) and the adapter rings (3) of the adapter assemblies have different outer diameters (d31) corresponding to the inner diameters (d22) of the roller bodies (2).

12. The modular system according to claim 10,
characterized in
that the drive wheels (5) have different outer diameters (d51) and identical inner diameters (d52) and the adapter tubes (4) of the adapter assemblies have identical outer diameters (41) corresponding to the inner diameter (d52) of the drive wheels (5),
and in particular in that the different adapter rings (3) have identical inner diameters (d31) corresponding to the outer diameter (d41) of the adapter tube (4).

13. The method for producing a conveyor roller according to claim 1,
characterized in
that the adapter assembly (A) comprises an adapter tube (4) and a separate adapter ring (3).

14. A method for producing a conveyor roller,
the conveyor roller (1) comprising:
a cylindrical roller body (2),
a drive wheel (5), in particular for connecting the conveyor roller (1) to a rotary drive (102) of a conveyor device (100),
an adapter assembly (A) for connecting the drive wheel (5) to the roller body (2), the method comprising the following steps:
providing the, in particular tubular, roller body (2),
providing the drive wheel (5),
at least indirectly connecting the drive wheel (5) to the roller body (2) by applying a laser welded joint,
the roller body (2), the adapter assembly (A), and the drive wheel (5) are provided with a zinc layer (2) on the surface,
wherein the drive wheel (5), the adapter assembly (A) and the roller body (2) are provided with the zinc layer before assembly, and
wherein by applying the laser welded joint, the zinc layer is only destroyed to such a small extent that its cathodic corrosion protection is retained.

* * * * *